US009052565B2

(12) United States Patent
Shikii et al.

(10) Patent No.: US 9,052,565 B2
(45) Date of Patent: Jun. 9, 2015

(54) LIGHT DEFLECTOR AND LIQUID CRYSTAL DISPLAY DEVICE USING THE SAME

(75) Inventors: Shinichi Shikii, Nara (JP); Katsuhiko Hayashi, Nara (JP); Motonobu Yoshikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 249 days.

(21) Appl. No.: 13/521,784

(22) PCT Filed: Nov. 16, 2011

(86) PCT No.: PCT/JP2011/006378
§ 371 (c)(1),
(2), (4) Date: Jul. 12, 2012

(87) PCT Pub. No.: WO2012/066776
PCT Pub. Date: May 24, 2012

(65) Prior Publication Data
US 2013/0093663 A1    Apr. 18, 2013

Related U.S. Application Data

(60) Provisional application No. 61/414,580, filed on Nov. 17, 2010.

(51) Int. Cl.
*G09G 5/00*  (2006.01)
*G02F 1/29*  (2006.01)

(52) U.S. Cl.
CPC ............ *G02F 1/29* (2013.01); *G02F 2001/291* (2013.01)

(58) Field of Classification Search
CPC ....... G09G 3/22; G09G 3/003; G09G 3/2092; G09G 2360/18; G02B 6/0038; G02B 6/0056; G02F 1/29; G02F 2001/291
USPC .......... 345/7, 156, 576–589, 613; 348/51, 98, 348/115, 203, 290, 576, 577, 770; 349/15, 349/51, 62, 193; 359/290, 298; 353/7; 347/131, 251, 256
See application file for complete search history.

(56) References Cited

U.S. PATENT DOCUMENTS 4,268,871 A * 5/1981 Kawamura .................... 347/251
4,477,184 A * 10/1984 Endo .......................... 356/141.1
(Continued)

FOREIGN PATENT DOCUMENTS

| JP | 2000-507005 | 6/2000 |
|----|-------------|--------|
| JP | 2003-066405 | 3/2003 |

(Continued)

OTHER PUBLICATIONS

International Search Report issued Mar. 6, 2012 in International (PCT) Application No. PCT/JP2011/006376.

*Primary Examiner* — Prabodh M Dharia
(74) *Attorney, Agent, or Firm* — Wenderoth, Lind & Ponack, L.L.P.

(57) ABSTRACT

A light deflector capable of deflecting light in a predetermined deflection direction and modulating the angle of deflection of light includes a plurality of liquid crystal deflection elements arranged in the predetermined deflection direction. In at least one pair of adjacent liquid crystal deflection elements, the dimension of one of the liquid crystal deflection elements in the predetermined deflection direction is different from the dimension of the other liquid crystal deflection element in the predetermined deflection direction.

17 Claims, 7 Drawing Sheets

(56) References Cited

U.S. PATENT DOCUMENTS

| | | | |
|---|---|---|---|
| 4,842,396 A * | 6/1989 | Minoura et al. | 359/212.1 |
| 4,897,715 A * | 1/1990 | Beamon, III | 348/115 |
| 5,930,044 A | 7/1999 | Schleipen | |
| 5,945,967 A * | 8/1999 | Rallison et al. | 345/32 |
| 6,002,207 A * | 12/1999 | Beeteson et al. | 313/542 |
| 6,160,603 A * | 12/2000 | Tanaka et al. | 349/143 |
| 6,201,565 B1 * | 3/2001 | Balogh | 348/40 |
| 6,879,431 B2 | 4/2005 | Ide | |
| 7,245,430 B2 | 7/2007 | Kobayashi et al. | |
| 7,720,116 B2 | 5/2010 | Anderson et al. | |
| 7,954,967 B2 | 6/2011 | Kashiwagi et al. | |
| 8,648,904 B2 * | 2/2014 | Hamano et al. | 348/115 |
| 2003/0179426 A1 | 9/2003 | Ide | |
| 2004/0042213 A1 * | 3/2004 | Kimura et al. | 362/317 |
| 2004/0090520 A1 * | 5/2004 | Sakai et al. | 347/225 |
| 2004/0263968 A1 | 12/2004 | Kobayashi et al. | |
| 2005/0225629 A1 * | 10/2005 | Kubota et al. | 348/51 |
| 2005/0265403 A1 | 12/2005 | Anderson et al. | |
| 2005/0271325 A1 | 12/2005 | Anderson et al. | |
| 2006/0181671 A1 * | 8/2006 | Sugimoto et al. | 349/172 |
| 2006/0238545 A1 * | 10/2006 | Bakin et al. | 345/613 |
| 2006/0256185 A1 * | 11/2006 | Suzuki et al. | 347/256 |
| 2008/0008413 A1 | 1/2008 | Anderson et al. | |
| 2008/0008414 A1 | 1/2008 | Anderson et al. | |
| 2008/0165437 A1 * | 7/2008 | DiDomenico | 359/728 |
| 2009/0052164 A1 | 2/2009 | Kashiwagi et al. | |
| 2009/0122575 A1 * | 5/2009 | Omura et al. | 362/608 |
| 2009/0289950 A1 * | 11/2009 | Hamano et al. | 345/589 |
| 2010/0110558 A1 * | 5/2010 | Lee et al. | 359/639 |
| 2010/0165464 A1 * | 7/2010 | Lin et al. | 359/570 |
| 2010/0238277 A1 * | 9/2010 | Takahashi et al. | 348/59 |
| 2011/0211142 A1 | 9/2011 | Kashiwagi et al. | |
| 2012/0287037 A1 * | 11/2012 | Shikii et al. | 345/156 |

FOREIGN PATENT DOCUMENTS

| | | |
|---|---|---|
| JP | 2004-325494 | 11/2004 |
| JP | 2007-199445 | 8/2007 |
| JP | 2008-134652 | 6/2008 |
| JP | 2009-026641 | 2/2009 |
| JP | 2009-053345 | 3/2009 |
| WO | 98/30934 | 7/1998 |
| WO | 2005/069918 | 8/2005 |

* cited by examiner

FIG. 7A - PRIOR ART
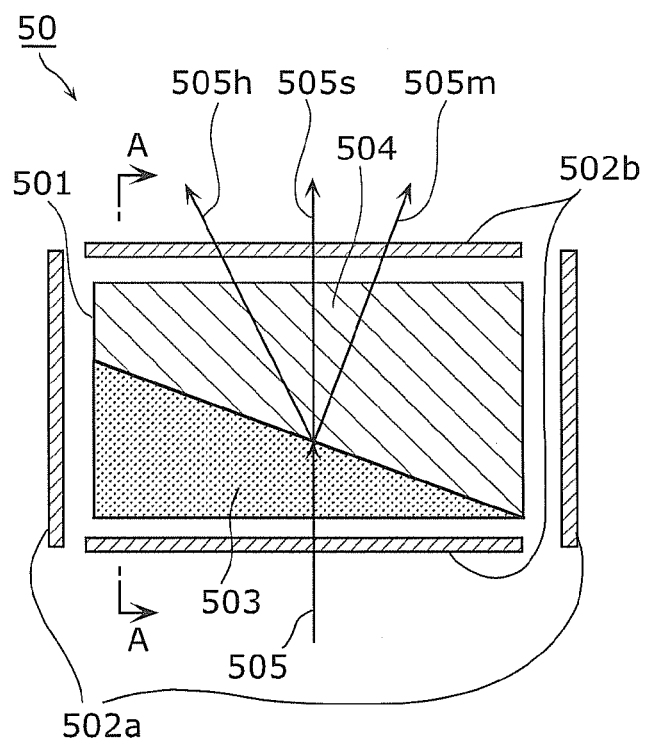
FIG. 7B - PRIOR ART
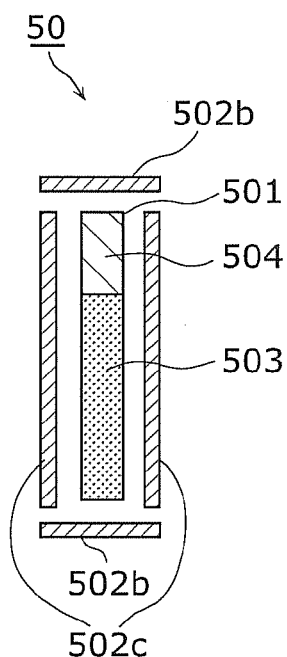

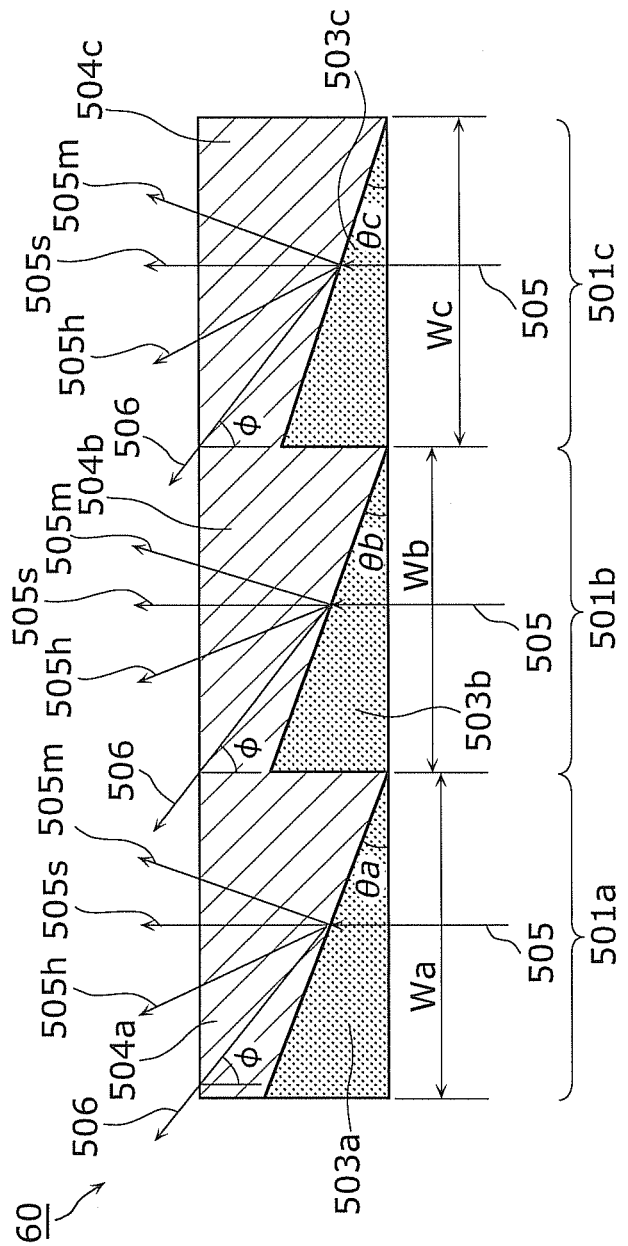
FIG. 8 - PRIOR ART

LIGHT DEFLECTOR AND LIQUID CRYSTAL DISPLAY DEVICE USING THE SAME

This application, which is the U.S. National Stage of International Application PCT/JP2011/006376, filed Nov. 16, 2011, claims the benefit of U.S. Provisional Application 61/414,580, filed Nov. 17, 2010.

TECHNICAL FIELD

The present invention relates to a light deflector that deflects light and a liquid crystal display device using the same.

BACKGROUND ART

Various light deflectors that deflect light have conventionally been studied. Light deflectors are devices indispensable to, for example, laser scanners used in laser printers or the like. Examples of conventional light deflectors that are used include polygon scanners, galvanometer scanners, and MEMS mirrors. However, since such polygon scanners, galvanometer scanners, MEMS mirrors, or the like include a mobile unit (mechanical mechanism) for moving parts, there is a problem in that a failure easily occurs. For this reason, there is demand for the development of light deflectors capable of deflecting light without including a mobile unit.

In response to that demand, a light deflector as disclosed in Patent Document 1 below has been proposed. This light deflector does not include a mobile unit, and deflects light with use of the fact that the refractive indices of liquid crystals are modulated by application of voltage. Through this, it is possible to reduce the occurrence of failures and achieve high reliability.

Now, a conventional light deflector will be described with reference to FIGS. 7A and 7B. FIG. 7A is a cross-sectional view of a conventional light deflector, and FIG. 7B is a cross-sectional view of the light deflector taken along line A-A in FIG. 7A. A light deflector 50 shown in FIGS. 7A and 7B includes a liquid crystal deflection element 501 and three pairs of electrodes 502a, 502b, and 502c disposed in the periphery of the liquid crystal deflection element 501. The liquid crystal deflection element 501 includes a liquid crystal 503 having a triangular shape in cross section and a dielectric 504 having a shape complementary to that of the liquid crystal 503. The dielectric 504 is disposed on the inclined face side of the liquid crystal 503, as a result of which the liquid crystal deflection element 501 as a whole is configured in a rectangular shape in cross section. The dielectric 504 may be made of, for example, a polymeric resin or the like such as a plastic, or glass or the like. The three pairs of electrodes 502a, 502b, and 502c are each disposed such that the two electrodes face each other with the liquid crystal deflection element 501 therebetween.

By applying voltage between each of the three pairs of electrodes 502a, 502b, and 502c, the refractive index of the liquid crystal 503 is modulated, and light incident on the liquid crystal deflection element 501 is deflected. Note that although the three pairs of electrodes 502a, 502b, and 502c are provided in the configuration shown in FIGS. 7A and 7B, a configuration is also possible in which only any one or two out of these three pairs of electrodes are provided.

As indicated by an arrow 505 in FIG. 7A, light enters the liquid crystal deflection element 501 from the incidence end face of the liquid crystal 503 (lower face in FIG. 7A). Note that the pair of electrodes 502b is desirably a pair of transparent electrodes so that light can pass through the pair of electrodes 502b.

When a refractive index NL of the liquid crystal 503 and a refractive index ND of the dielectric 504 are the same value in a state in which no voltage is applied between the pairs of electrodes 502a, 502b, and 502c, light travels straight in a direction indicated by an arrow 505s in FIG. 7A without being refracted. When the refractive index NL of the liquid crystal 503 becomes higher than the refractive index ND of the dielectric 504 as a result of application of voltage between the pairs of electrodes 502a, 502b, and 502c, light is refracted in a direction indicated by an arrow 505h in FIG. 7A. Furthermore, when the refractive index NL of the liquid crystal 503 becomes lower than the refractive index ND of the dielectric 504 as a result of application of voltage between the pairs of electrodes 502a, 502b, and 502c, light is refracted in a direction indicated by an arrow 505m in FIG. 7A. In this way, the angle of deflection of light can be modulated by controlling the voltage applied between the pairs of electrodes 502a, 502b, and 502c.

Furthermore, a configuration as shown in FIG. 8 is also possible in which a plurality of (three in FIG. 8) liquid crystal deflection elements 501a, 501b, and 501c are arranged in the lateral direction. In a light deflector 60 in FIG. 8, dielectrics 504a, 504b, and 504c are respectively disposed on the inclined face side of the liquid crystals 503a, 503b, and 503c. The dielectrics 504a, 504b, and 504c are configured as a single entity. A dimension Wa of the liquid crystal deflection element 501a, a dimension Wb of the liquid crystal deflection element 501b, and a dimension Wc of the liquid crystal deflection element 501c in the direction of light deflection (right-left direction in FIG. 8) are all the same dimension (Wa=Wb=Wc). Furthermore, a tilt angle θa of the inclined face of the liquid crystal 503a, a tilt angle θb of the inclined face of the liquid crystal 503b, and a tilt angle θc of the inclined face of the liquid crystal 503c are all the same angle (θa=θb=θc). Note that the aforementioned three pairs of electrodes are not shown in FIG. 8.

Arranging the liquid crystal deflection elements 501a, 501b, and 501c in this manner enables deflection of wide light (e.g., linear light, planar light, or the like).

CITATION LIST

Patent Literature

[PTL 1] WO/2005/069918

SUMMARY OF INVENTION

Technical Problem

However, the above-described conventional light deflectors have the following problems. The first problem is that in the light deflector 50 shown in FIG. 7A, since the amount of the refractive index of the liquid crystal 503 that can be modulated at the time of application of voltage between the pairs of electrodes 502a, 502b, and 502c is small, the light deflection angle cannot be increased.

The second problem is that when wide light is deflected by arranging the liquid crystal deflection elements 501a, 501b, and 501c as in the light deflector 60 shown in FIG. 8, a loss in the amount of light occurs due to occurrence of diffracted light, and as a result, the amount of light emitted from the liquid crystal deflection elements 501a, 501b, and 501c at a predetermined deflection angle decreases. In the light deflector 60 shown in FIG. 8, diffracted light occurs in the following manner. Specifically, diffracted light occurs in the direction of an angle φ that satisfies a predetermined condition, due to the fact that the layout structure of the liquid crystal deflection elements 501*a*, 501*b*, and 501*c* is periodic, i.e., the dimensions Wa, Wb, and Wc of the liquid crystal deflection elements 501*a*, 501*b*, and 501*c* in the light deflection direction are all the same dimension. In FIG. 8, diffracted light occurs in the direction indicated by arrows 506. Assuming that the dimensions Wa, Wb, and Wc of the liquid crystal deflection elements 501*a*, 501*b*, and 501*c* in the light deflection direction satisfy Wa=Wb=Wc=D, the above predetermined condition is expressed by the following formula 1.

[Math. 1]

$$D \times \sin\phi = n \times \frac{\lambda}{ND} \qquad \text{(Formula 1)}$$

In the formula 1, λ is the wavelength of light, ND is the refractive index of the dielectrics 504*a*, 504*b*, and 504*c*, and *n* is any integer. Also, φ is the angle of emission of diffracted light relative to the vertical direction (up-down direction in FIG. 8). For example, when light is deflected in the direction indicated by arrows 505*m* in FIG. 8, diffracted light occurs in the directions of the angle φ), and as a result, the amount of the light deflected in the directions indicated by the arrows 505*m* in FIG. 8 is reduced by the amount of the diffracted light.

Furthermore, there are cases in which liquid crystal display devices such as tablet three-dimensional (3D) displays, for example, are configured using the above-described conventional light deflectors. However, the following problem arises with such configured liquid crystal display devices. As described above, since the light deflection angle cannot be increased with the light deflectors, a problem arises in that the viewing angles of the liquid crystal display devices are narrowed. In addition, since a loss in the amount of light occurs due to the occurrence of diffracted light in the light deflectors as described above, there is a problem in that the luminance of the liquid crystal display devices is reduced.

The present invention has been conceived in order to solve the above-described conventional problems, and it is an object of the present invention to provide a light deflector capable of increasing the light deflection angle and reducing a loss in the amount of light due to the occurrence of diffracted light, and a liquid crystal display device using such a light deflector.

Solution to Problem

In order to attain the above-described object, a light deflector according to an embodiment of the present invention is a light deflector capable of deflecting light in a predetermined deflection direction and modulating an angle of deflection of the light. The light deflector includes a plurality of light deflection elements arranged in the predetermined deflection direction. In at least one pair of adjacent light deflection elements among the light deflection elements, one of the light deflection elements has a dimension different from a dimension of the other light deflection element, in the predetermined deflection direction.

With such a configuration, it is possible to reduce the occurrence of diffracted light and reduce a loss in the amount of light due to the occurrence of diffracted light. As a result, a highly efficient light deflector can be achieved.

It is preferable for the light deflector to further include an angle magnifying lens provided on a light emission side of the light deflection elements, wherein an angle of deflection of light emitted from the light deflection elements is increased by the angle magnifying lens.

With such a configuration, it is possible to increase the angle of deflection of the light emitted from the light deflector.

Furthermore, it is preferable for the light deflection elements to be arranged in a plurality of layers in a direction from a light incident side to a light emission side.

With such a configuration, it is possible to increase the angle of deflection of the light emitted from the light deflector.

Furthermore, it is preferable that the light deflection elements are liquid crystal deflection elements, and refractive indices of the liquid crystal deflection elements are modulated by application of voltage to the liquid crystal deflection elements, whereby light incident on each of the liquid crystal deflection elements is deflected by refraction.

With such a configuration, the light incident on the liquid crystal deflection elements can be deflected by refraction with a simple structure.

Furthermore, a light deflector according to an embodiment of the present invention is a light deflector capable of deflecting light in a predetermined deflection direction by diffraction and modulating an angle of deflection of the light. The light deflector includes a plurality of liquid crystal deflection elements arranged in the predetermined deflection direction. The liquid crystal deflection elements have approximately the same dimension in the predetermined deflection direction, and refractive indices of the liquid crystal deflection elements are modulated by application of voltage to the liquid crystal deflection elements, whereby light incident on each of the liquid crystal deflection elements is deflected by diffraction.

With such a configuration, it is possible to achieve a light deflector having a great light deflection angle.

Furthermore, it is preferable that openings of the liquid crystal deflection elements through which light enters each have a dimension of less than or equal to 50 μm in the predetermined deflection direction.

With such a configuration, light can be deflected by diffraction at a deflection angle greater than a maximum available refraction angle.

It is preferable for the light deflector to further include an angle magnifying lens provided on a light emission side of the liquid crystal deflection elements, wherein an angle of deflection of light emitted from the liquid crystal deflection elements is increased by the angle magnifying lens.

With such a configuration, it is possible to increase the angle of deflection of the light emitted from the light deflector.

Furthermore, it is preferable that the liquid crystal deflection elements are arranged in a plurality of layers in a direction from a light incident side to a light emission side.

With such a configuration, it is possible to increase the angle of deflection of the light emitted from the light deflector.

Furthermore, a liquid crystal display device according to an embodiment of the present invention includes the light deflector according to any one of Claims 1 to 8, a light source provided on a light incident side of the light deflector, and a liquid crystal panel provided on a light emission side of the light deflector. Light emitted from the light source is incident on the light deflector, deflected by the light deflector, then emitted from the light deflector, and incident on the liquid crystal panel.

With such a configuration, since the light deflection angle is increased with the light deflector, it is possible to widen the viewing angle of the liquid crystal display device. Furthermore, since a loss in the amount of light due to occurrence of diffracted light is reduced with the light deflector, it is possible to increase the luminance of the liquid crystal display device.

Furthermore, it is preferable that the light source is configured to sequentially emit light of a plurality of colors having different wavelengths, and when the light of a plurality of colors having different wavelengths emitted from the light source is sequentially incident on the light deflector, refractive indices of a plurality of light deflection elements or refractive indices of a plurality of liquid crystal deflection elements are modulated in accordance with the wavelength of incident light so that the light of a plurality of colors having different wavelengths has the same angle of deflection.

With such a configuration, it is possible to emit uniform white light without color drifts.

Furthermore, a liquid crystal display device according to an embodiment of the present invention includes a light deflector that deflects light in a predetermined deflection direction, a light source that is provided on a light incident side of the light deflector and emits light toward the light deflector, and a liquid crystal panel that is provided on a light emission side of the light deflector and on which the light deflected by the light deflector is incident. The liquid crystal panel includes a plurality of pixels arranged in a predetermined direction, the pixels each include a plurality of sub-pixels, and a direction in which the sub-pixels are arranged is orthogonal to the predetermined deflection direction.

With such a configuration, even if light is deflected at any deflection angle in pixels, an equal amount of light enters the sub-pixels. As a result, a liquid crystal display device without color unevenness and with high image quality can be achieved.

Furthermore, a liquid crystal display device according to an embodiment of the present invention includes a light deflector that deflects light in a predetermined deflection direction, a light source that is provided on a light incident side of the light deflector and emits light toward the light deflector, and a liquid crystal panel that is provided on a light emission side of the light deflector and on which the light deflected by the light deflector is incident. The light deflector includes a plurality of light deflection elements arranged in the predetermined deflection direction, the liquid crystal panel includes a plurality of pixels arranged in the predetermined deflection direction, and each of the pixels has a dimension greater than a dimension of each of the light deflection elements, in the predetermined deflection direction.

With such a configuration, since the light emitted from the light deflection element enters all pixels, it is possible to thoroughly irradiate all of the pixels with the light.

Furthermore, it is preferable that the dimension of each of the pixels in the predetermined deflection direction is an integral multiple of the dimension of each of the light deflection elements in the predetermined deflection direction.

With such a configuration, it is possible to reduce a loss due to the absorption of light incident on a boundary portion between each pair of adjacent pixels, and to thereby improve the efficiency in light usage. Furthermore, since the spatial frequency of the light deflection elements in the deflection direction is a constant multiple of the spatial frequency of the pixels in the deflection direction, it is possible to prevent the occurrence of moires and achieve a liquid crystal display device with high image quality.

It is preferable for the liquid crystal display device to further include a detection unit configured to detect positions of a right eye and a left eye of a viewer viewing the liquid crystal panel, and a control unit configured to control an angle of light deflection by the light deflector based on the positions of the right eye and the left eye detected by the detection unit. The control unit switches the angle of light deflection by the light deflector in time series so that the light emitted from the liquid crystal panel is brought to alternately focus on the positions of the right eye and the left eye detected by the detection unit, in time series.

With such a configuration, it is possible to achieve a liquid crystal display device that serves as a 3D display.

Advantageous Effects of Invention

As described above, the light deflectors of the present invention are capable of increasing the light deflection angle and reducing a loss in the amount of light due to the occurrence of diffracted light. Furthermore, the liquid crystal display devices of the present invention are capable of widening the viewing angle with use of the above-described light deflectors and thereby increasing the efficiency in light usage.

BRIEF DESCRIPTION OF DRAWINGS

FIG. 7A is a cross-sectional view showing a conventional light deflector.

FIG. 7B is a cross-sectional view of the light deflector taken along line A-A in FIG. 7A.

FIG. 8 is a cross-sectional view showing a conventional light deflector in which a plurality of light deflection elements is arranged.

DESCRIPTION OF EMBODIMENTS

Figure 1:
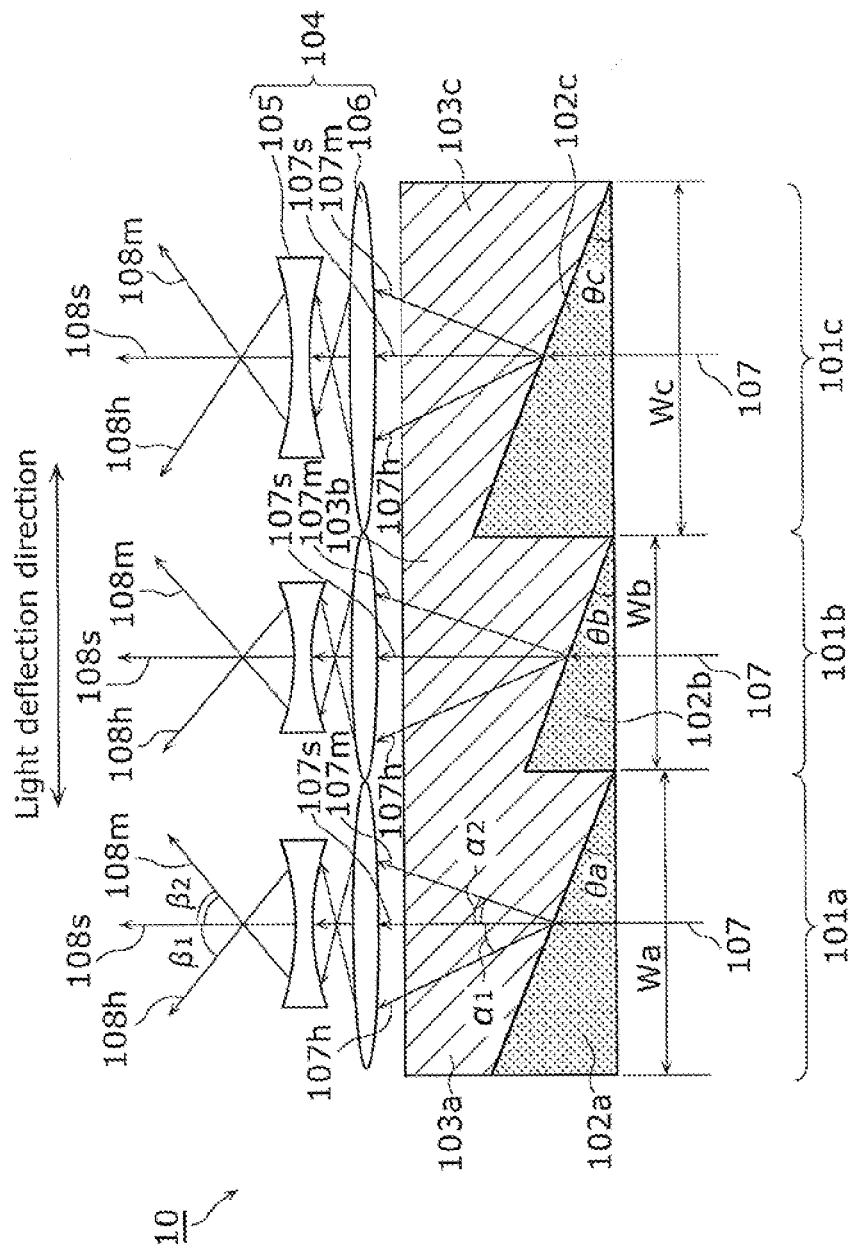
FIG. 1 is a cross-sectional view showing a light deflector according to Embodiment 1 of the present invention.

Hereinafter, embodiments of the present invention will be described with reference to the drawings. In the following description, the same constituent elements are given the same reference numerals, and descriptions thereof may be omitted. Note that the embodiments to be described hereinafter are preferable and specific examples of the present invention. The numerical values, forms, materials, constituent elements, the positions at which the constituent elements are disposed, and the like that will be illustrated in the following embodiments are merely examples, and the present invention is not intended to be limited to these examples. The present invention is limited by only the scope of the appended claims. Accordingly, among constituent elements described in the following embodiments, those that are not described in the independent claims, which indicate the broadest concept of the present invention, are not necessarily required to attain the object of the present invention, but they are described as constituent elements forming a more preferable mode. Furthermore, the drawings mainly show constituent elements in schematic form in order to facilitate understanding of the present invention.

Embodiment 1

FIG. 1 is a cross-sectional view showing a light deflector 10 according to Embodiment 1 of the present invention. The light deflector 10 shown in FIG. 1 is configured by arranging a plurality of (in this embodiment, three) liquid crystal deflection elements 101a, 101b, and 101c in the direction of light deflection (right-left direction in FIG. 1). These liquid crystal deflection elements 101a, 101b, and 101c each constitute a light deflection element.

The liquid crystal deflection elements 101a, 101b, and 101c respectively include liquid crystals 102a, 102b, and 102c, each having a triangular shape in cross section, and dielectrics 103a, 103b, and 103c having shapes complementary to those of the liquid crystals 102a, 102b, and 102c. The dielectrics 103a, 103b, and 103c are disposed on the inclined face side of the liquid crystals 102a, 102b, and 102c. As a result, the liquid crystal deflection elements 101a, 101b, and 101c as a whole are each configured in a rectangular shape in cross section. The dielectrics 103a, 103b, and 103c may be made of, for example, a polymeric resin or the like such as a plastic, or glass or the like. Note that in this embodiment, the dielectrics 103a, 103b, and 103c are configured as a single entity.

In the light deflector 10 of this embodiment, a dimension Wa of the liquid crystal deflection element 101a, a dimension Wb of the liquid crystal deflection element 101b, and a dimension Wc of the liquid crystal deflection element 101c in the light deflection direction are set to be different dimensions. For example, the dimension Wa of the liquid crystal deflection element 101a is 100 μm, the dimension Wb of the liquid crystal deflection element 101b is 80 μm, and the dimension Wc of the liquid crystal deflection element 101c is 120 μm. A tilt angle θa of the inclined face of the liquid crystal 102a, a tilt angle θb of the inclined face of the liquid crystal 102b, and a tilt angle θc of the inclined face of the liquid crystal 102c are all set to be the same angle.

Furthermore, a pair of electrodes (not shown) is provided for applying voltage to the liquid crystals 102a, 102b, and 102c of the liquid crystal deflection elements 101a, 101b, and 101c. The pair of electrodes is disposed such that the two electrodes face each other with the liquid crystal deflection elements 101a, 101b, and 101c therebetween. By controlling the voltage applied between the pair of electrodes, refractive indices NL of the liquid crystals 102a, 102b, and 102c can be modulated in a predetermined modulation range. For example, when a first voltage is applied between the pair of electrodes, the refractive indices NL of the liquid crystals 102a, 102b, and 102c are respectively higher than refractive indices ND of the dielectrics 103a, 103b, and 103c. When a second voltage different from the above first voltage is applied between the pair of electrodes, the refractive indices NL of the liquid crystals 102a, 102b, and 102c are respectively lower than the refractive indices ND of the dielectrics 103a, 103b, and 103c. In a state in which no voltage is applied between the pair of electrodes, the refractive indices NL of the liquid crystals 102a, 102b, and 102c are respectively the same values as the refractive indices ND of the dielectrics 103a, 103b, and 103c.

Furthermore, angle magnifying lenses 104 are respectively disposed on the light emission side of the liquid crystal deflection elements 101a, 101b, and 101c. In this embodiment, the angle magnifying lenses 104 are each configured by combining a concave lens 105 and a convex lens 106. The convex lenses 106 and the concave lenses 105 are disposed in the order specified from near the light emission side of the liquid crystal deflection elements 101a, 101b, and 101c. Disposing the angle magnifying lenses 104 in this way enables the angle of deflection of light emitted from the liquid crystal deflection elements 101a, 101b, and 101c to be increased.

Next is a description of a method for deflecting light with the light deflector 10 of this embodiment. A light source (not shown) is disposed on the light incident side of the light deflector 10. As indicated by arrows 107 in FIG. 1, light emitted from the light source is incident on the incidence end faces (lower faces in FIG. 1) of the liquid crystals 102a, 102b, and 102c.

When no voltage is applied between the pair of electrodes, the refractive indices NL of the liquid crystals 102a, 102b, and 102c are respectively the same values as the refractive indices ND of the dielectrics 103a, 103b, and 103c. As a result, the light incident on the incidence end faces of the liquid crystals 102a, 102b, and 102c travels straight as indicated by arrows 107s in FIG. 1 without being refracted at the interfaces between the liquid crystals 102a, 102b, and 102c and the dielectrics 103a, 103b, and 103c. Note that the light deflection angle refers to an angle at which light is deflected relative to the vertical direction (up-down direction in FIG. 1). In this case, the light deflection angle is 0°. Light emitted from the liquid crystal deflection elements 101a, 101b, and 101c further travels straight while passing through the convex lenses 106 and the concave lenses 105 of the angle magnifying lenses 104 and is then emitted from the angle magnifying lenses 104 as indicated by arrows 108s in FIG. 1.

When, for example, the above first voltage is applied between the pair of electrodes, since the refractive indices NL of the liquid crystals 102a, 102b, and 102c are respectively higher than the refractive indices ND of the dielectrics 103a, 103b, and 103c, light is refracted at the interfaces between the liquid crystals 102a, 102b, and 102c and the dielectrics 103a, 103b, and 103c as indicated by arrows 107h in FIG. 1. In this case, the light deflection angle is $\alpha_1$. Light deflected and emitted from the liquid crystal deflection elements 101a, 101b, and 101c passes through the angle magnifying lenses 104 and is then emitted from the angle magnifying lenses 104 as indicated by arrows 108h in FIG. 1. The light deflection angle is increased by the convex lenses 106 and the concave lenses 105 of the angle magnifying lenses 104. Accordingly, the deflection angle $\beta_1$ of the light emitted from the angle magnifying lenses 104 is greater than the deflection angle $\alpha_1$ of the light emitted from the liquid crystal deflection elements 101a, 101b, and 101c.

When, for example, the above second voltage is applied between the pair of electrodes, since the refractive indices NL of the liquid crystals 102a, 102b, and 102c are respectively lower than the refractive indices ND of the dielectrics 103a, 103b, and 103c, the light is refracted at the interfaces between the liquid crystals 102a, 102b, and 102c and the dielectrics 103a, 103b, and 103c as indicated by arrows 107m in FIG. 1. In this case, the light deflection angle is $\alpha_2$. Similarly to as described above, light deflected and emitted from the liquid crystal deflection elements 101a, 101b, and 101c passes through the angle magnifying lenses 104 and is then emitted from the angle magnifying lenses 104 as indicated by arrows 108m in FIG. 1. The deflection angle $\alpha_2$ of the light deflected and emitted from the liquid crystal deflection elements 101a, 101b, and 101c is increased by the angle magnifying lenses 104. As a result, the deflection angle $\beta_2$ of the light emitted from the angle magnifying lenses 104 is greater than the deflection angle $\alpha_z$ of the light emitted from the liquid crystal deflection elements 101a, 101b, and 101c.

As described above, in the light deflector 10 of this embodiment, in at least one pair of adjacent liquid crystal deflection elements 101a and 101b (or 101b and 101c), the dimensions Wa and Wb (or Wb and Wc) of the liquid crystal deflection elements in the light deflection direction are different from each other. As a result, the layout structure of the liquid crystal deflection elements 101a, 101b, and 101c is non-periodic, and therefore the predetermined condition expressed by the above-described formula 1 is not satisfied. It is thus possible to reduce the occurrence of diffracted light.

Note that although the three liquid crystal deflection elements 101a, 101b, and 101c are arranged in the light deflection direction in this embodiment, the present invention is not limited to this. For example, a configuration is possible in which two liquid crystal deflection elements, or four or more liquid crystal deflection elements are arranged in the light deflection direction. Furthermore, a configuration is also possible in which a plurality of liquid crystal deflection elements are arranged in a matrix in a predetermined deflection direction (right-left direction in FIG. 1) and a direction orthogonal to the above predetermined deflection direction (direction perpendicular to the plane of the drawing of FIG. 1).

Furthermore, although this embodiment describes a case in which the liquid crystal deflection elements 101a, 101b, and 101c that deflect light by refraction are used as the light deflection elements constituting the light deflector 10, the present invention is not limited to this, and it is also possible to use other light deflection elements that deflect light using a method other than refraction.

Moreover, although in this embodiment, the angle magnifying lenses 104 are configured by combining the convex lenses 106 and the concave lenses 105, the present invention is not limited to this, and the angle magnifying lenses 104 may be configured by using another type of lens singly or using other types of lenses in combination.

Embodiment 2

Figure 2:
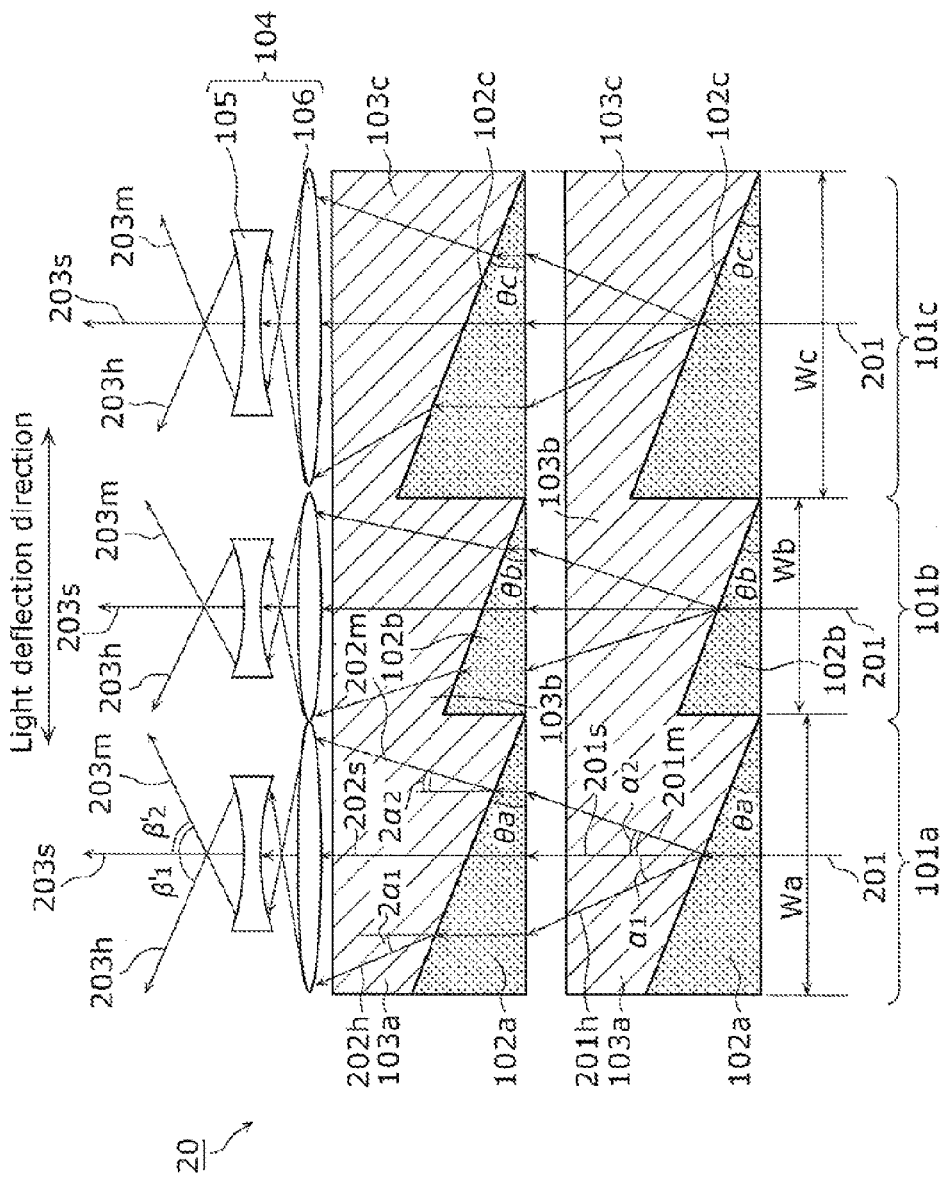
FIG. 2 is a cross-sectional view showing a light deflector according to Embodiment 2 of the present invention.

FIG. 2 is a cross-sectional view showing a light deflector 20 according to Embodiment 2 of the present invention. The light deflector 20 shown in FIG. 2 is configured by arranging the liquid crystal deflection elements 101a, 101b, and 101c of Embodiment 1 in a plurality of (in this embodiment, two) layers in a direction from the light incident side to the light emission side (direction from bottom to top in FIG. 2). Angle magnifying lenses 104 are disposed on the light emission side of the liquid crystal deflection elements 101a, 101b, and 101c in the upper layer. Furthermore, a pair of electrodes (not shown) is provided for applying voltage to the liquid crystals 102a, 102b, and 102c of the liquid crystal deflection elements 101a, 101b, and 101c in both the upper and lower layers. The pair of electrodes is disposed such that the two electrodes face each other with the upper- and lower-layer liquid crystal deflection elements 101a, 101b, and 101c therebetween.

Next is a description of a method for deflecting light with the light deflector 20 of this embodiment. As indicated by arrows 201 in FIG. 2, light from a light source (not shown) is incident on the incidence end faces of the lower-layer liquid crystals 102a, 102b, and 102c.

When no voltage is applied between the pair of electrodes, in the upper- and lower-layer liquid crystal deflection elements 101a, 101b, and 101c, the refractive indices NL of the liquid crystals 102a, 102b, and 102c are respectively the same values as the refractive indices ND of the dielectrics 103a, 103b, and 103c. As a result, light travels straight through the lower-layer liquid crystal deflection elements 101a, 101b, and 101c as indicated by arrows 201s in FIG. 2, and then travels straight through the upper-layer liquid crystal deflection elements 101a, 101b, and 101c as indicated by arrows 202s in FIG. 2. In this case, the light deflection angle is 0°. Light emitted from the upper-layer liquid crystal deflection elements 101a, 101b, and 101c further travels straight while passing through the angle magnifying lenses 104 and is then emitted from the angle magnifying lenses 104 as indicated by arrows 203s in FIG. 2.

When, for example, the above first voltage is applied between the pair of electrodes, in the upper- and lower-layer liquid crystal deflection elements 101a, 101b, and 101c, the refractive indices NL of the liquid crystals 102a, 102b, and 102c are respectively higher than the refractive indices ND of the dielectrics 103a, 103b, and 103c. As a result, the light incident on the incidence end faces of the lower-layer liquid crystals 102a, 102b, and 102c is refracted at the interfaces between the liquid crystals 102a, 102b, and 102c and the dielectrics 103a, 103b, and 103c as indicated by arrows 201h in FIG. 2. In this case, the light deflection angle is $\alpha_1$. Light deflected and emitted from the lower-layer liquid crystal deflection elements 101a, 101b, and 101c is incident on the incidence end faces of the liquid crystals 102a, 102b, and 102c of the upper-layer liquid crystal deflection elements 101a, 101b, and 101c. This incident light is refracted at the interfaces between the liquid crystals 102a, 102b, and 102c and the dielectrics 103a, 103b, and 103c as indicated by arrows 202h in FIG. 2. In this case, the light deflection angle is $2\alpha_1$. At this time, the deflection angle $2\alpha_1$ of the light emitted from the upper-layer liquid crystal deflection elements 101a, 101b, and 101c is (approximately two times) greater than the deflection angle $\alpha_1$ of the light emitted from the lower-layer liquid crystal deflection elements 101a, 101b, and 101c. The light emitted from the upper-layer liquid crystal deflection elements 101a, 101b, and 101c passes through the angle magnifying lenses 104 and is then emitted from the angle magnifying lenses 104. At this time, the light deflection angle is increased by the convex lenses 106 and the concave lenses 105 of the angle magnifying lenses 104. As a result, a deflection angle $\beta_1'$ of the light emitted from the angle magnifying lenses 104 is greater than the deflection angle $2\alpha_1$ of the light emitted from the upper-layer liquid crystal deflection elements 101a, 101b, and 101c.

When, for example, the above second voltage is applied between the pair of electrodes, in the upper- and lower-layer liquid crystal deflection elements 101a, 101b, and 101c, the refractive indices NL of the liquid crystals 102a, 102b, and 102c are respectively lower than the refractive indices ND of the dielectrics 103a, 103b, and 103c. As a result, the light incident on the incidence end faces of the lower-layer liquid crystals 102a, 102b, and 102c is refracted at the interfaces between the liquid crystals 102a, 102b, and 102c and the dielectrics 103a, 103b, and 103c as indicated by arrows 201m in FIG. 2. In this case, the light deflection angle is $\alpha_2$. Light emitted from the lower-layer liquid crystal deflection elements 101a, 101b, and 101c is incident on the incidence end faces of the upper-layer liquid crystals 102a, 102b, and 102c. This incident light is refracted at the interfaces between the liquid crystals 102a, 102b, and 102c and the dielectrics 103a, 103b, and 103c as indicated by arrows 202m in FIG. 2. In this case, the light deflection angle is $2\alpha_2$. At this time, the deflection angle $2\alpha_2$ of the light emitted from the upper-layer liquid crystal deflection elements 101a, 101b, and 101c is (approximately two times) greater than the deflection angle $\alpha_2$ of the light emitted from the lower-layer liquid crystal deflection elements 101a, 101b, and 101c. The light emitted from the upper-layer liquid crystal deflection elements 101a, 101b, and 101c passes through the angle magnifying lenses 104 and is then emitted from the angle magnifying lenses 104. At this time, the light deflection angle is increased by the convex lenses 106 and the concave lenses 105 of the angle magnifying lenses 104. As a result, a deflection angle $\beta_2'$ of the light emitted from the angle magnifying lenses 104 is greater than the deflection angle $2\alpha_2$ of the light emitted from the upper-layer liquid crystal deflection elements 101a, 101b, and 101c.

Accordingly, with the light deflector 20 of this embodiment, the deflection angle of the light emitted from the light deflector 20 can be increased by arranging a plurality of liquid crystal deflection elements 101a, 101b, and 101c in a plurality of layers.

Note that although in this embodiment, a plurality of liquid crystal deflection elements 101a, 101b, and 101c are arranged in two layers, a configuration is also possible in which a plurality of liquid crystal deflection elements are arranged in three, or four or more layers. As the number of layers of the liquid crystal deflection elements 101a, 101b, and 101c increases, the deflection angle of the light emitted from the light deflector 20 further increases.

Embodiment 3

Figure 3:
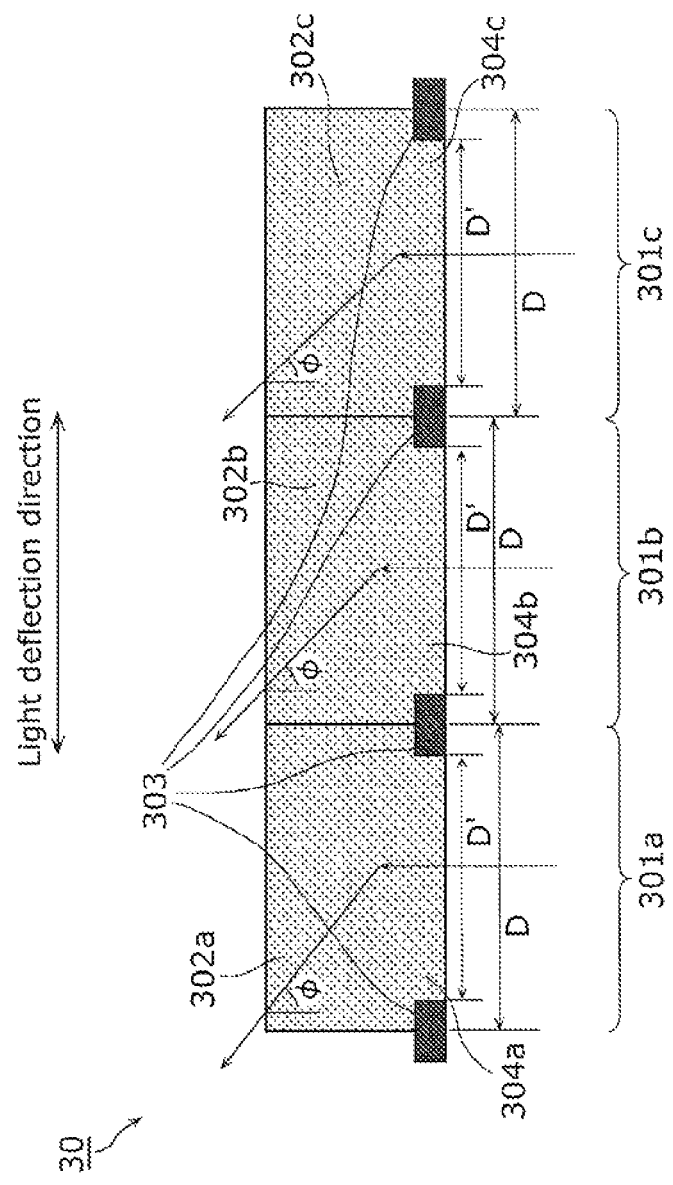
FIG. 3 is a cross-sectional view showing a light deflector according to Embodiment 3 of the present invention.

FIG. 3 is a cross-sectional view showing a light deflector 30 according to Embodiment 3 of the present invention. The light deflector 30 shown in FIG. 3 is configured by arranging a plurality of (in this embodiment, three) liquid crystal deflection elements 301a, 301b, and 301c in the direction of light deflection (right-left direction in FIG. 3). The liquid crystal deflection elements 301a, 301b, and 301c are respectively configured by liquid crystals 302a, 302b, and 302c each having a rectangular shape in cross section. The liquid crystal deflection elements 301a, 301b, and 301c are configured such that their dimensions D in the light deflection direction are approximately the same dimension.

Furthermore, a light-amount limiting unit 303 is disposed on the incidence end faces of the liquid crystal deflection elements 301a, 301b, and 301c. The light-amount limiting unit 303 is configured by a diffraction grating and provided with a plurality of opening limiting units 304a, 304b, and 304c in correspondence with the liquid crystal deflection elements 301a, 301b, and 301c. The opening limiting units 304a, 304b, and 304c are configured such that their dimensions D' in the light deflection direction are smaller than the dimensions D of the liquid crystal deflection elements 301a, 301b, and 301c in the light deflection direction.

Furthermore, a pair of electrodes (not shown) is provided for applying voltage to the liquid crystals 302a, 302b, and 302c. The pair of electrodes is disposed such that the two electrodes face each other with the liquid crystal deflection elements 301a, 301b, and 301c therebetween.

Now, a method for deflecting light with the light deflector 30 of this embodiment will be described. Light incident on the incidence end faces (lower faces in FIG. 3) of the liquid crystal deflection elements 301a, 301b, and 301c propagates through the liquid crystals 302a, 302b, and 302c while being diffracted by the opening limiting units 304a, 304b, and 304c of the light-amount limiting unit 303. Here, when the liquid crystal deflection elements 301a, 301b, and 301c all have a dimension D in the light deflection direction, light travels in the direction of an angle $\phi$ that satisfies the following formula 2, as a result of the diffraction.

[Math. 2]

$$D \times \sin\phi = n \times \frac{\lambda}{NL} \quad \text{(Formula 2)}$$

In the formula 2, n is an integer, $\lambda$ is the wavelength of light, and NL is the refractive index of the liquid crystals 302a, 302b, and 302c.

In the formula 2, for example, when n=1, $\lambda$=450 nm, D=1 μm, light is emitted in the direction of the angle $\phi$ of 17.5°. Accordingly, the light deflector 30 of this embodiment is capable of deflecting light at a relatively great deflection angle $\phi$. Furthermore, the light deflection angle can be modulated by modulating the refractive indices NL of the liquid crystals 302a, 302b, and 302c through the application of voltage between the pair of electrodes.

Note that although in this embodiment, the liquid crystals 302a, 302b, and 302c are configured in a rectangular shape in cross section, the liquid crystals 302a, 302b, and 302c may be configured in a prism shape. Through this, it is possible to increase the intensity of diffracted light in a predetermined direction.

The dimension D' of the opening limiting units 304a, 304b, and 304c in the light deflection direction is preferably less than or equal to 50 μm. The reason for this is as follows. Diffracted light occurs in the direction of the angle $\phi$ that satisfies the above formula 2 within the range of angles limited by the following formula 3.

[Math. 3]

$$AngleRange(\text{rad}) = \frac{Wavelength(\mu m)}{OpeningWidth(\mu m)} \quad \text{(Formula 3)}$$

When light is deflected by diffraction caused by a periodic prism array, the manufacturing available aspect ratio of prisms configured by liquid crystals and dielectrics (lateral dimension of prism:longitudinal dimension of prism) is approximately 10:1. Since the difference in refractive index between liquid crystals and dielectrics is approximately a maximum of 0.1, the maximum refraction angle is approximately 0.6°. In order to deflect light at an angle greater than this refraction angle by diffraction, it can be derived from the formula 3 that, in the case of light having a wavelength of 532 nm (green light), the opening width (i.e., the dimension of the openings through which light enters, in the light deflection direction in the crystal deflection elements 301a, 301b, and 301c) is approximately less than or equal to 50 μm. Accordingly, if the dimension D' of the opening limiting units 304a, 304b, and 304c in the light deflection direction is set to be less than or equal to 50 μm, it is possible to deflect light by diffraction at an angle greater than the maximum available refraction angle.

Furthermore, in this embodiment as well, it is possible to dispose angle magnifying lenses on the light emission side of the liquid crystal deflection elements 301a, 301b, and 301c as in Embodiments 1 and 2. Through this, it is possible to increase the deflection angle of light emitted from the liquid crystal deflection elements 301a, 301b, and 301c.

Furthermore, in this embodiment as well, it is also possible to employ a configuration as in Embodiment 2 in which the liquid crystal deflection elements 301a, 301b, and 301c are arranged in a plurality of layers in the direction from the light incident side to the light emission side.

Note that although the light-amount limiting unit 303 is provided in the configuration of this embodiment, this light-amount limiting unit 303 may be omitted. Even with such a configuration, since the dimensions D of the liquid crystal deflection elements 301a, 301b, and 301c in the light deflection direction are approximately the same, the effect of light diffraction can be obtained with the liquid crystal deflection elements 301a, 301b, and 301c.

Embodiment 4

Figure 4:
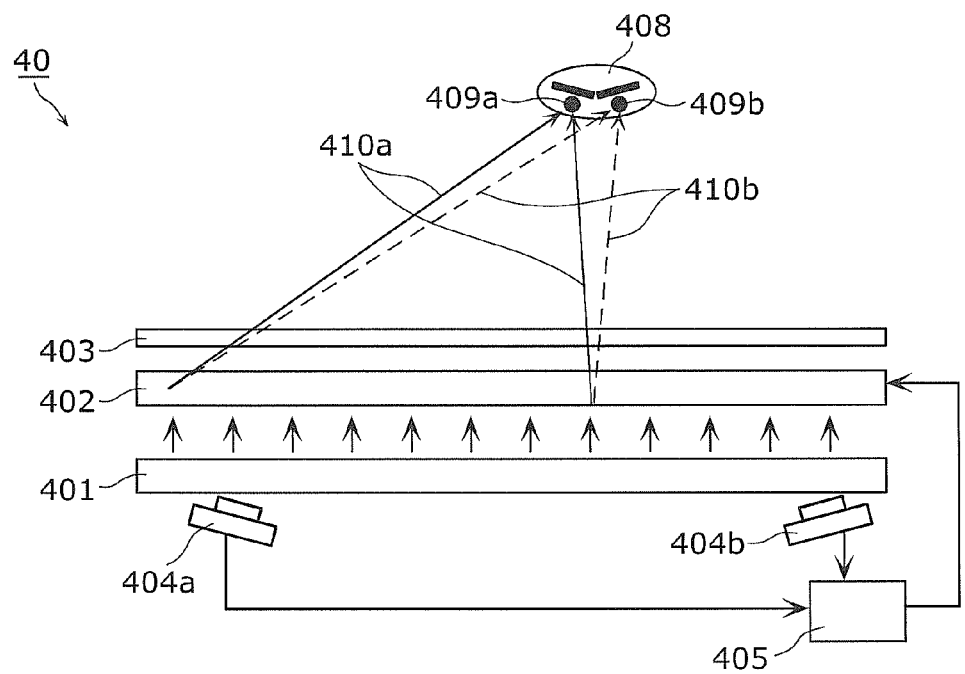
FIG. 4 is a diagram showing a liquid crystal display device according to Embodiment 4 of the present invention.

FIG. 4 is a diagram showing a liquid crystal display device 40 according to Embodiment 4. The liquid crystal display device 40 shown in FIG. 4 includes a rectangular frame (not shown) in which a light source 401, a light deflector 402, a liquid crystal panel 403, a right-side camera 404a, a left-side camera 404b, and a control unit 405 are housed. The liquid crystal display device 40 of this embodiment is configured by, for example, a tablet 3D display panel.

The light deflector 402 is configured to be capable of deflecting incident light in a predetermined deflection direction (right-left direction in FIG. 4) and modulating the angle of light deflection. For example, the light deflector 10 of Embodiment 1, the light deflector 20 of Embodiment 2, or the light deflector 30 of Embodiment 3 can be used as the light deflector 402. The light deflector 402 is configured in a panel-like shape, and a plurality of light deflection elements 406 (see FIG. 5A) constituting the light deflector 402 are arranged in a matrix.

The light source 401 is configured by a plane-shaped light source and disposed facing the incidence end face of the light deflector 402. Light emitted from the light source 401 enters the incidence end face of the light deflector 402.

The liquid crystal panel 403 is disposed facing the emission end face of the light deflector 402. A plurality of pixels 407 (see FIG. 5A) are arranged in a matrix in a display area of the liquid crystal panel 403.

The right-side camera 404a detects the position of a right eye 409a of a viewer 408 viewing the liquid crystal display device 40. The left-side camera 404b detects the position of a left eye 409b of the viewer 408 viewing the liquid crystal display device 40. The right-side camera 404a and the left-side camera 404b constitute a detection unit.

The control unit 405 controls voltage to be applied to liquid crystals (not shown) of the light deflection elements 406 constituting the light deflector 402, based on a right-eye position detection signal received from the right-side camera 404a and a left-eye position detection signal received from the left-side camera 404b, thereby modulating the refractive indices of the liquid crystals.

Figure 5A:
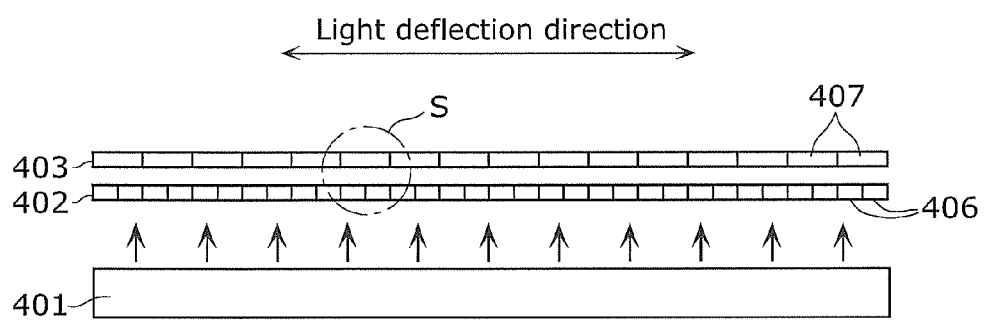
FIG. 5A is a diagram showing a light source, a light deflector, and a liquid crystal panel that are extracted from the liquid crystal display device in FIG. 4.
Figure 5B:
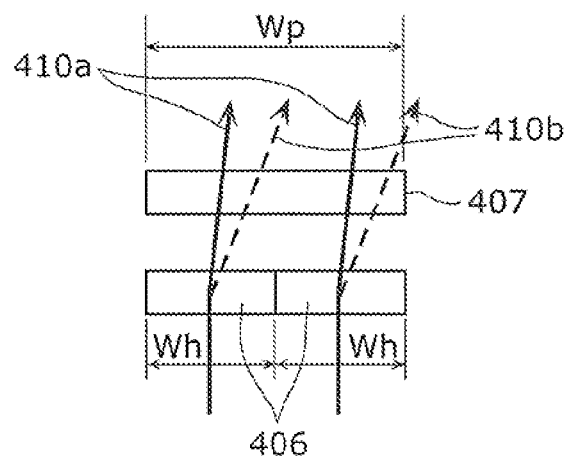
FIG. 5B is an enlarged view of a region S enclosed by the dashed dotted line in FIG. 5A.

Next, the arrangement relationship between the pixels 407 constituting the liquid crystal panel 403 and the light deflection elements 406 constituting the light deflector 402 will be described with reference to FIGS. 5A and 5B. FIG. 5A is a diagram showing the light source 401, the light deflector 402, and the liquid crystal panel 403 that are extracted from FIG. 4. FIG. 5B is an enlarged view of a region S enclosed by the dashed dotted line in FIG. 5A.

As shown in FIG. 5B, the configuration is such that a dimension Wp of the pixels 407, which constitute the liquid crystal panel 403, in the light deflection direction (right-left direction in FIGS. 5A and 5B) is greater than a dimension Wh of the light deflection elements 406 in the light deflection direction. As a result, light emitted from the light deflection elements 406 enters all of the pixels 407, and thus it is possible to thoroughly irradiate all of the pixels 407 with the light.

Note that the dimension Wp of the pixels 407 in the light deflection direction is preferably an integral multiple of the dimension Wh of the light deflection elements 406 in the light deflection direction. Through this, it is possible to reduce a loss due to the absorption of light incident on the boundary between each pair of adjacent pixels 407 and to thereby improve the efficiency in light usage. In addition, since the spatial frequency of the light deflection elements 406 in the deflection direction is a constant multiple of the spatial frequency of the pixels 407 in the deflection direction, it is possible to prevent the occurrence of moires and achieve the liquid crystal display device 40 with high image quality.

Figure 6:
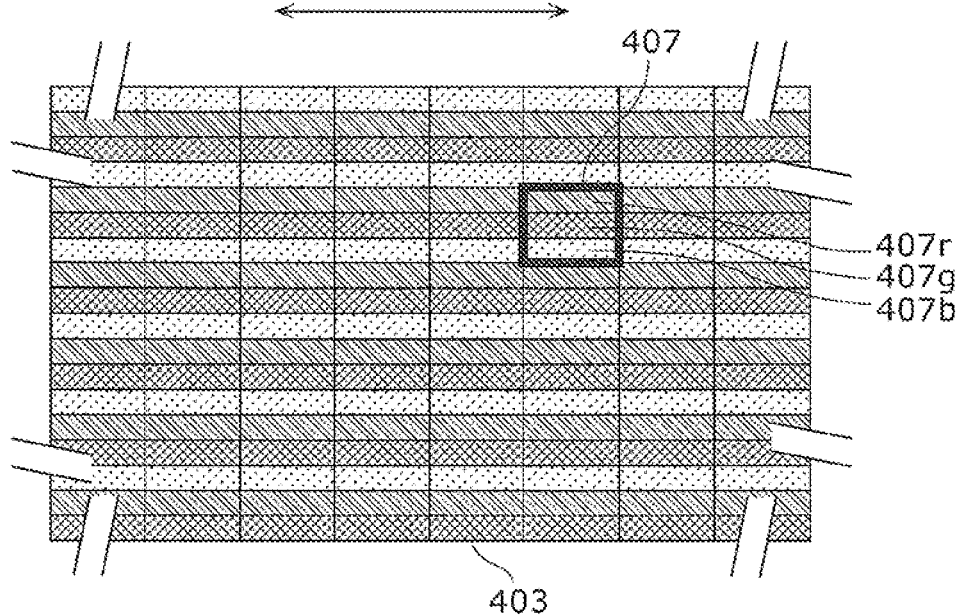
FIG. 6 is a diagram showing the arrangement of a plurality of pixels constituting a liquid crystal panel.

Next, the arrangement of the pixels 407 constituting the liquid crystal panel 403 will be described with reference to FIG. 6. FIG. 6 is a diagram showing the arrangement of the pixels 407 constituting the liquid crystal panel 403. In this embodiment, the pixels 407 each consist of three sub-pixels, namely, a red sub-pixel 407r, a green sub-pixel 407g, and a blue sub-pixel 407b. In each of the pixels 407, the red sub-pixel 407r, the green sub-pixel 407g, and the blue sub-pixel 407b are arranged in a direction orthogonal to the light deflection direction (right-left direction in FIG. 6). With such arrangement, even if light is deflected at any deflection angle within the pixel 407, an equal one-third amount of the light enters each of the red sub-pixel 407r, the green sub-pixel 407g, and the blue sub-pixel 407b. As a result, the liquid crystal display device 40 without color unevenness and with high image quality can be achieved.

Next, a mechanism of operations performed by the liquid crystal display device 40 of this embodiment will be described with reference to FIG. 4. The right-side camera 404a and the left-side camera 404b detect the positions of the right eye 409a and the left eye 409b, respectively, of the viewer 408 viewing the liquid crystal display device 40. The right-eye position detection signal from the right-side camera 404a and the left-eye position detection signal from the left-side camera 404b are transmitted to the control unit 405. The control unit 405 controls the voltage to be applied to the liquid crystals of the light deflection elements 406 constituting the light deflector 402, based on the right-eye position detection signal from the right-side camera 404a and the left-eye position detection signal from the left-side camera 404b, thereby modulating the refractive indices of the liquid crystals of the light deflection elements 406.

When the light source 401 starts to illuminate, light emitted from the light source 401 passes through the light deflector 402 and the liquid crystal panel 403, and is emitted toward the outside of the liquid crystal display device 40. At this time, as a result of the liquid crystal panel 403 being irradiated with the light emitted from the light deflector 402, an image is formed on the liquid crystal panel 403.

During the period until a predetermined time has elapsed after the start of the illumination of the light source 401, the control unit 405 modulates the refractive indices of the liquid crystals of the light deflection elements 406. As a result, the light emitted from the light source 401 is deflected by the light deflector 402 as indicated by arrows 410a in FIG. 4 and brought to focus on the position of the right eye 409a of the viewer 408. At the time at which the light is deflected toward the right eye 409a in this way, an image for the right eye is displayed on the liquid crystal panel 403.

After the above predetermined time has elapsed, the control unit 405 modulates the refractive indices of the liquid crystals of the light deflection elements 406. As a result, the light emitted from the light source 401 is deflected by the light deflector 402 as indicated by arrows 410b in FIG. 4 and brought to focus on the position of the left eye 409b of the viewer 408. At the time at which the light is deflected toward the left eye 409b in this way, an image for the left eye is displayed on the liquid crystal panel 403.

In this way, the control unit 405 switches the angle of light deflection by the light deflector 402 in time series. Accordingly, the light emitted from the light source 401 is deflected by the light deflector 402 and brought to alternately focus on the positions of the right eye 409a and the left eye 409b of the viewer 408 in time series. An image for the right eye is displayed on the liquid crystal panel 403 at the time when the light is deflected toward the right eye 409a, and an image for the left eye is displayed on the liquid crystal panel 403 at the time when the light is deflected toward the left eye 409b. As a result, the viewer 408 can recognize a 3D image.

Note that when any one of the light deflectors of Embodiments 1 to 3 is used as the light deflector 402, the following configuration is possible, for example. The light source 401 is configured to repeatedly emit red laser light (with a wavelength of 640 nm), green laser light (with a wavelength of 532 nm), and blue laser light (with a wavelength of 450 nm) sequentially in time series. By adjusting the refractive indices of the liquid crystals of the liquid crystal deflection elements when the laser light of each color is emitted, the laser light of each color can have the same deflection angle. As a result, it is possible to sequentially emit the laser light of each color in the same direction in time series and to thereby emit uniform white light without color drifts.

Note that although this embodiment describes the case in which there is a single viewer, even if there are a plurality of viewers, the liquid crystal display device can function as a 3D display. In this case, light is brought to focus on the right and left eyes of a plurality of detected viewers by deflection, and appropriate images are displayed at appropriate times on the liquid crystal panel 403.

Furthermore, in the case where the same image is displayed on the liquid crystal panel 403 as an image for the right eye and an image for the left eye, the viewer 408 recognizes these images as a 2D image. However, people other than the viewer 408 cannot recognize the image displayed on the liquid crystal panel 403. Thus, the liquid crystal display device 40 can function as a privacy display.

Note that the light source 401 may be configured by, for example, disposing multiple white LEDs or the like in plane form, or disposing multiple red, blue, and green LEDs in plane form. As another alternative, the light source 401 may be configured by, for example, LEDs, cold cathode fluorescent lamps (CCFLs), or lasers that are disposed on the side face of a light guide plate.

Furthermore, in the liquid crystal display device 40 of this embodiment, the angle magnifying lenses 104 of Embodiment 1 may be disposed between the light deflector 402 and the liquid crystal panel 403. Through this, even if the distance between the liquid crystal panel 403 and the viewer 408 is relatively short, it is possible to deflect light and to widen a visible range (viewing angle) of the liquid crystal display device serving as a 3D display panel, a privacy display panel or the like.

Moreover, although in this embodiment, the positions of the right eye 409a and the left eye 409b of the viewer 408 are detected with the two cameras 404a and 404b, the positions of the right eye 409a and the left eye 409b may be detected using another method instead. For example, the positions of both eyes 409a and 409b of the viewer 408 may be detected based on a difference between images of the eyes 409a and 409b captured with the cameras 404a and 404b.

While the above has been a description of Embodiments 1 to 4 of the present invention, the configurations described above in Embodiments 1 to 4 are merely examples, and it goes without saying that various modifications are possible within a scope that does not depart from the gist of the invention. Furthermore, it is of course possible to combine Embodiments 1 to 4 described above, or combine inventions obtained through modifying these embodiments.

INDUSTRIAL APPLICABILITY

The light deflectors of the present invention are applicable as light deflectors capable of increasing the light deflection angle as well as reducing a loss in the amount of light due to the occurrence of diffracted light. Furthermore, the liquid crystal display devices using the light deflectors of the present invention are applicable as, for example, tablet 3D display panels, stationary-type 3D display panels, or privacy display panels.

REFERENCE SIGNS LIST 10, 20, 30, 50, 60, 402 Light deflector
40 Liquid crystal display device
101a, 101b, 101c, 301a, 301b, 301c, 501, 501a, 501b, 501c Liquid crystal deflection element
102a, 102b, 102c, 302a, 302b, 302c, 503, 503a, 503b, 503c Liquid crystal
103a, 103b, 103c, 504, 504a, 504b, 504c Dielectric
104 Angle magnifying lens
105 Concave lens
106 Convex lens
303 Light-amount limiting unit
304a, 304b, 304c Opening limiting unit
401 Light source
403 Liquid crystal panel
404a Right-side camera
404b Left-side camera
405 Control unit
406 Light deflection element
407 Pixel
407r Red sub-pixel
407g Green sub-pixel
407b Blue sub-pixel
408 Viewer
409a Right eye
409b Left eye
502a, 502b, 502c Electrode

The invention claimed is:

1. A light deflector capable of deflecting light in a predetermined deflection direction and modulating an angle of deflection of the light, said light deflector comprising
    a plurality of liquid crystal deflection elements having a non-periodic structure arranged in the predetermined deflection direction,
    wherein, said liquid crystal deflection elements having the non-periodic structure have different dimensions in the predetermined deflection direction, and
    refractive indices of said liquid crystal deflection elements are modulated by application of voltage to said liquid crystal deflection elements, whereby light incident on each of said liquid crystal deflection elements is deflected by refraction.

2. The light deflector according to claim 1, further comprising
    an angle magnifying lens provided on a light emission side of said light deflection elements, wherein an angle of deflection of light emitted from said light deflection elements is increased by said angle magnifying lens.

3. The light deflector according to claim 1, wherein said light deflection elements are arranged in a plurality of layers in a direction from a light incident side to a light emission side.

4. A liquid crystal display device comprising
said light deflector according to claim 1;
a light source provided on a light incident side of said light deflector; and
a liquid crystal panel provided on a light emission side of said light deflector,
wherein light emitted from said light source is incident on said light deflector, deflected by said light deflector, then emitted from said light deflector, and incident on said liquid crystal panel.

5. The liquid crystal display device according to claim 4,
wherein said light source is configured to sequentially emit light of a plurality of colors having different wavelengths, and
when the light of the plurality of colors having different wavelengths emitted from said light source is sequentially incident on said light deflector, refractive indices of said plurality of light deflection elements are modulated in accordance with the respective wavelength of the light so that sequential beams of the light of the plurality of colors having different wavelengths have the same angle of deflection.

6. The liquid crystal display device according to claim 5,
wherein said light deflection elements are liquid crystal deflection elements.

7. The liquid crystal display device according to claim 4, further comprising
a detection unit configured to detect positions of a right eye and a left eye of a viewer viewing said liquid crystal panel; and
a control unit configured to control an angle of light deflection by said light deflector based on the positions of the right eye and the left eye detected by said detection unit,
wherein said control unit is configured to switch the angle of light deflection by said light deflector in time series so that the light emitted from said liquid crystal panel is brought to alternately focus on the positions of the right eye and the left eye detected by said detection unit, in time series.

8. A light deflector capable of deflecting light in a predetermined deflection direction by diffraction and modulating an angle of deflection of the light, said light deflector comprising
a plurality of liquid crystal deflection elements arranged in the predetermined deflection direction,
wherein said liquid crystal deflection elements have approximately the same dimension in the predetermined deflection direction,
refractive indices of said liquid crystal deflection elements are modulated by application of voltage to said liquid crystal deflection elements, whereby light incident on each of said liquid crystal deflection elements is deflected by diffraction, and
each of said liquid crystal deflection elements has an opening through which light enters, the opening having a dimension of 50 μm or less in the predetermined deflection direction.

9. The light deflector according to claim 8, further comprising
an angle magnifying lens provided on a light emission side of said liquid crystal deflection elements,
wherein an angle of deflection of light emitted from said liquid crystal deflection elements is increased by said angle magnifying lens.

10. The light deflector according to claim 8,
wherein said liquid crystal deflection elements are arranged in a plurality of layers in a direction from a light incident side to a light emission side.

11. A liquid crystal display device comprising
said light deflector according to claim 8;
a light source provided on a light incident side of said light deflector; and
a liquid crystal panel provided on a light emission side of said light deflector,
wherein light emitted from said light source is incident on said light deflector, deflected by said light deflector, then emitted from said light deflector, and incident on said liquid crystal panel.

12. The liquid crystal display device according to claim 11,
wherein said light source is configured to sequentially emit light of a plurality of colors having different wavelengths, and
when the light of the plurality of colors having different wavelengths emitted from said light source is sequentially incident on said light deflector, refractive indices of said plurality of liquid crystal deflection elements are modulated in accordance with the respective wavelength of the light so that sequential beams of the light of the plurality of colors having different wavelengths have the same angle of deflection.

13. The liquid crystal display device according to claim 11, further comprising
a detection unit configured to detect positions of a right eye and a left eye of a viewer viewing said liquid crystal panel; and
a control unit configured to control an angle of light deflection by said light deflector based on the positions of the right eye and the left eye detected by said detection unit,
wherein said control unit is configured to switch the angle of light deflection by said light deflector in time series so that the light emitted from said liquid crystal panel is brought to alternately focus on the positions of the right eye and the left eye detected by said detection unit, in time series.

14. A liquid crystal display device comprising
a light deflector that deflects light in a predetermined deflection direction;
a light source that is provided on a light incident side of said light deflector and emits light toward said light deflector; and
a liquid crystal panel that is provided on a light emission side of said light deflector and on which the light deflected by said light deflector is incident,
wherein said liquid crystal panel includes a plurality of pixels arranged in a predetermined direction,
said pixels each include a plurality of sub-pixels, and
a direction in which said sub-pixels are arranged is orthogonal to the predetermined deflection direction.

15. The liquid crystal display device according to claim 14, further comprising
a detection unit configured to detect positions of a right eye and a left eye of a viewer viewing said liquid crystal panel; and
a control unit configured to control an angle of light deflection by said light deflector based on the positions of the right eye and the left eye detected by said detection unit, wherein said control unit is configured to switch the angle of light deflection by said light deflector in time series so that the light emitted from said liquid crystal panel is brought to alternately focus on the positions of the right eye and the left eye detected by said detection unit, in time series.

16. A liquid crystal display device comprising
a light deflector that deflects light in a predetermined deflection direction;
a light source that is provided on a light incident side of said light deflector and emits light toward said light deflector; and
a liquid crystal panel that is provided on a light emission side of said light deflector and on which the light deflected by said light deflector is incident,
wherein said light deflector includes a plurality of light deflection elements arranged in the predetermined deflection direction,
said liquid crystal panel includes a plurality of pixels arranged in the predetermined deflection direction,
each of said pixels has a dimension greater than a dimension of each of said light deflection elements, in the predetermined deflection direction, and
said pixels are irradiated with light deflected from said light deflection elements.

17. The liquid crystal display device according to claim 16, further comprising
a detection unit configured to detect positions of a right eye and a left eye of a viewer viewing said liquid crystal panel; and
a control unit configured to control an angle of light deflection by said light deflector based on the positions of the right eye and the left eye detected by said detection unit,
wherein said control unit is configured to switch the angle of light deflection by said light deflector in time series so that the light emitted from said liquid crystal panel is brought to alternately focus on the positions of the right eye and the left eye detected by said detection unit, in time series.

* * * * *

UNITED STATES PATENT AND TRADEMARK OFFICE
CERTIFICATE OF CORRECTION

PATENT NO. : 9,052,565 B2  
APPLICATION NO. : 13/521784  
DATED : June 9, 2015  
INVENTOR(S) : Shinichi Shikii et al.

Page 1 of 1

It is certified that error appears in the above-identified patent and that said Letters Patent is hereby corrected as shown below:

On the Title Page:

In Item (86), "PCT/JP2011/006378" should read --PCT/JP2011/006376--.

Signed and Sealed this  
First Day of December, 2015

Michelle K. Lee  
*Director of the United States Patent and Trademark Office*